United States Patent [19]

Stewart

[11] 4,230,534
[45] Oct. 28, 1980

[54] CONTROL OF A FRACTIONAL DISTILLATION COLUMN

[75] Inventor: William S. Stewart, Bartlesville, Okla.

[73] Assignee: Phillips Petroleum Company, Bartlesville, Okla.

[21] Appl. No.: 23,353

[22] Filed: Mar. 23, 1979

[51] Int. Cl.² .............................................. B01D 3/42
[52] U.S. Cl. ........................................ 203/1; 203/2; 203/3; 203/DIG. 18; 203/DIG. 8; 203/DIG. 16; 62/21; 202/160; 364/501
[58] Field of Search ........................................ 203/1-3, 203/DIG. 18, DIG. 8, DIG. 16, 26, 39; 202/160, 161, 181, 196, 193, 206; 62/21, 37; 208/DIG. 1; 585/800; 196/132, 141; 364/501

[56] References Cited

U.S. PATENT DOCUMENTS

| | | | |
|---|---|---|---|
| 3,271,270 | 9/1966 | Lupfer et al. | 202/160 |
| 3,272,722 | 9/1966 | Walker | 202/160 |
| 3,296,097 | 1/1967 | Lupfer | 202/160 |
| 3,296,241 | 1/1967 | Berger | 526/76 |
| 3,322,136 | 5/1967 | Matta | 137/118 |
| 3,408,261 | 10/1968 | Johnson et al. | 202/160 |
| 3,423,291 | 1/1969 | Oglesby | 202/160 |
| 3,619,377 | 11/1971 | Palmer et al. | 203/1 |
| 3,905,873 | 9/1975 | Wright | 203/1 |
| 3,967,937 | 7/1976 | Hobbs | 55/18 |

*Primary Examiner*—Wilbur L. Bascomb, Jr.

[57] ABSTRACT

A control system is provided for a fractional distillation column where at least a portion of the overhead vapor stream from the fractional distillation column is utilized in a refrigeration and heating system for a process with which the fractional distillation column is associated. The liquid level is an overhead accumulator associated with the fractional distillation column is maintained at a level sufficient to insure that a sufficient supply of the overhead vapor stream from the fractional distillation column is available to supply the refrigeration and heating needs of the process with which the fractional distillation column is associated. Feedforward control based on the flow rate of the feed stream to the fractional distillation column and an analysis of the feed stream flowing to the fractional distillation column is utilized to maintain the desired liquid level in the overhead accumulator associated with the fractional distillation column even where fluctuations occur in the flow rate of the feed stream being provided to the fractional distillation column.

32 Claims, 3 Drawing Figures

CONTROL OF A FRACTIONAL DISTILLATION COLUMN

This invention relates to method and apparatus for controlling a fractional distillation system. In a particular aspect this invention relates to method and apparatus for controlling a fractional distillation system in which at least a portion of the overhead vapor stream is utilized in a refrigeration and heating system for a process. In another particular aspect this invention relates to method and apparatus for providing feedforward control of the flow rate of a liquid overhead product stream from an overhead accumulator associated with a fractional distillation column so as to insure that the liquid level in the overhead accumulator is sufficient to supply at least a portion of the refrigeration and heating requirements of a process even though the feed rate to the fractional distillation column may be varying.

Fractional distillation columns are commonly utilized to separate light components in a feed material from heavy components in the feed material. The lighter components of the feed material are generally removed from the fractional distillation column as an overhead vapor stream while the heavier components of the feed material are generally removed from the fractional distillation column as a liquid bottoms product. The overhead vapor stream is generally at least partially condensed to provide an overhead condensate. In some processes part of this condensate can be employed to supply a portion of the refrigeration and heating requirements of the overall process with which the fractional distillation column is associated. An example of this is an ethylene manufacturing process where part of the ethylene overhead condensate from an ethane-ethylene splitter ($C_2$ splitter) column is commonly utilized to provide a portion of the refrigeration and heating requirements for the remainder of the ethylene manufacturing process. Both the overhead vapor stream and the ethylene liquid condensate contained in an overhead accumulator associated with the fractional distillation column can be utilized in the refrigeration and heating system for the overall manufacturing process. It is thus important that the level of liquid ethylene in the overhead accumulator be maintained so as to insure that sufficient liquid ethylene is available to supply at least a portion of the refrigeration and heating requirements for the ethylene manufacturing process. If too much ethylene is removed from the overhead accumulator as a liquid overhead product, then insufficient liquid ethylene may remain to supply the heating and refrigeration requirements for the ethylene manufacturing process and to supply the external reflux to the $C_2$ splitter column with resulting damage to the ethylene manufacturing process.

Because of the very large capacity of the refrigeration and heating system for an ethylene manufacturing process, it is possible that a change could occur in the feed rate of the feed stream to the $C_2$ splitter column without causing a change in the liquid level in the overhead accumulator for a substantial period of time. If the rate at which liquid overhead product is being removed from the accumulator does not reflect the change in the feed rate of the feed stream to the $C_2$ splitter column, then it is possible that at a future time when the change in the feed rate to the $C_2$ splitter column affects the level of liquid ethylene in the overhead accumulator, that even shutting off entirely the flow of liquid overhead product from the overhead accumulator will not be sufficient to maintain a desired liquid level in the overhead accumulator. A substantial time may be required before the liquid level in the overhead accumulator can again be built up which results in insufficient liquid ethylene being available to serve as external reflux to the $C_2$ splitter and to supply at least a portion of the heating and refrigeration requirements for the ethylene manufacturing process.

It is desirable that a change in the flow rate of the feed material to the $C_2$ splitter be reflected immediately by change in the flow rate of the liquid overhead product from the overhead accumulator. This type of control, which is referred to as feedforward control, allows the liquid level in the overhead accumulator to be maintained even though the feed rate to the $C_2$ splitter may be fluctuating.

It is thus an object of this invention to provide method and apparatus for controlling a fractional distillation system. It is a particular object of this invention to provide method and apparatus for controlling a fractional distillation system where at least a portion of the overhead vapor system is utilized in a refrigeration and heating system for a process. It is another particular object of this invention to provide method and apparatus for providing feedforward control of the flow rate of a liquid overhead product stream from an overhead accumulator associated with a fractional distillation column so as to insure that the liquid level in the overhead accumulator is sufficient to supply at least a portion of the refrigeration and heating requirements of a process even though the feed rate to the fractional distillation column may be varying.

In accordance with the present invention, method and apparatus is provided whereby the flow of liquid overhead product out of an overhead accumulator associated with a fractional distillation column is controlled so as to insure that the liquid level in the overhead accumulator is sufficient to supply at least a portion of the refrigeration and heating requirements to a process by utilizing predictive feedforward control based on the flow rate of the feed material to the fractional distillation column and an analysis of the feed material flowing to the fractional distillation column. The analysis of the feed material provides an indication of the percentage of material in the feed material which will be separated as overhead vapor from the top of the fractional distillation column. This percentage is multiplied by the feed flow rate which is lagged by the propagation delay of the feed to the top of the fractional distillation column, to provide a prediction of the overhead vapor flow rate from the fractional distillation column at a future time. This prediction is multiplied by a constant which is representative of the percentage of overhead vapor flowing from the fractional distillation column which can be removed from the overhead accumulator while still maintaining a desired liquid level in the overhead accumulator. Provision is also made for overriding the feedforward control if the accumulator level drops below a low limit. When this occurs, control of the flow rate of liquid overhead product out of the overhead accumulator is manipulated so as to prevent the accumulator liquid level from dropping below the low limit. This provides protection against a malfunction in the feedforward control system.

The flow rate of heating fluid to the reboiler of the fractional distillation column can be manipulated in response to the feed flow rate into the fractional distillation column. The signal representing the feed flow rate into the fractional distillation column is delayed by the time period required for a portion of the feed to reach the bottom of the fractional distillation column to provide a prediction of the bottoms product flow rate. This predicted bottoms product flow rate can be biased by changes in the internal reflux in the fractional distillation column to provide feedforward control of the flow rate of heating fluid to the fractional distillation column.

Feedforward control for the external reflux flow rate to the fractional distillation column can be provided by delaying the feed flow rate by the time required for a portion of the feed to propagate to the top of the fractional distillation column to provide a prediction of the overhead flow rate from the fractional distillation column. A load curve plot of feed flow rate versus internal reflux flow rate can be utilized to provide a prediction as to the internal reflux flow rate at a future time based on the predicted feed flow rate at a future time. The predicted internal reflux flow rate can be utilized in the known equation $$R = Ri/1 + K\Delta T \qquad (I)$$

to calculate the required external reflux flow rate. In equation (I), R is the flow rate of the external reflux returning to the fractional distillation column, $\Delta T$ is the difference between the temperatures of the vapor from the reflux tray and the external reflux returning to the column, and K is equal to the specific heat of the external reflux divided by the heat of vaporization of the external reflux. This equation is developed in "Computer Control of Distillation Reflux", *ISA Journal*, 1959, pp 34–39, by D. E. Lupfer and D. E. Berger. The calculated required external reflux flow rate is utilized to regulate the flow rate of external reflux to the fractional distillation column.

The feedback control of the flow rate of the external reflux to the fracttional distillation column can be provided by analyzing the composition of the overhead vapor stream and comparing the actual composition to a desired composition. The results of the comparison can be utilized to bias the calculated required external reflux flow rate to provide an external reflux flow rate which will maintain a desired composition of the overhead vapor stream.

Other objects and advantages of the invention will be apparent from the detailed description of the invention and the appended claims as well as from the detailed description of the drawings in which:

Figure 1:
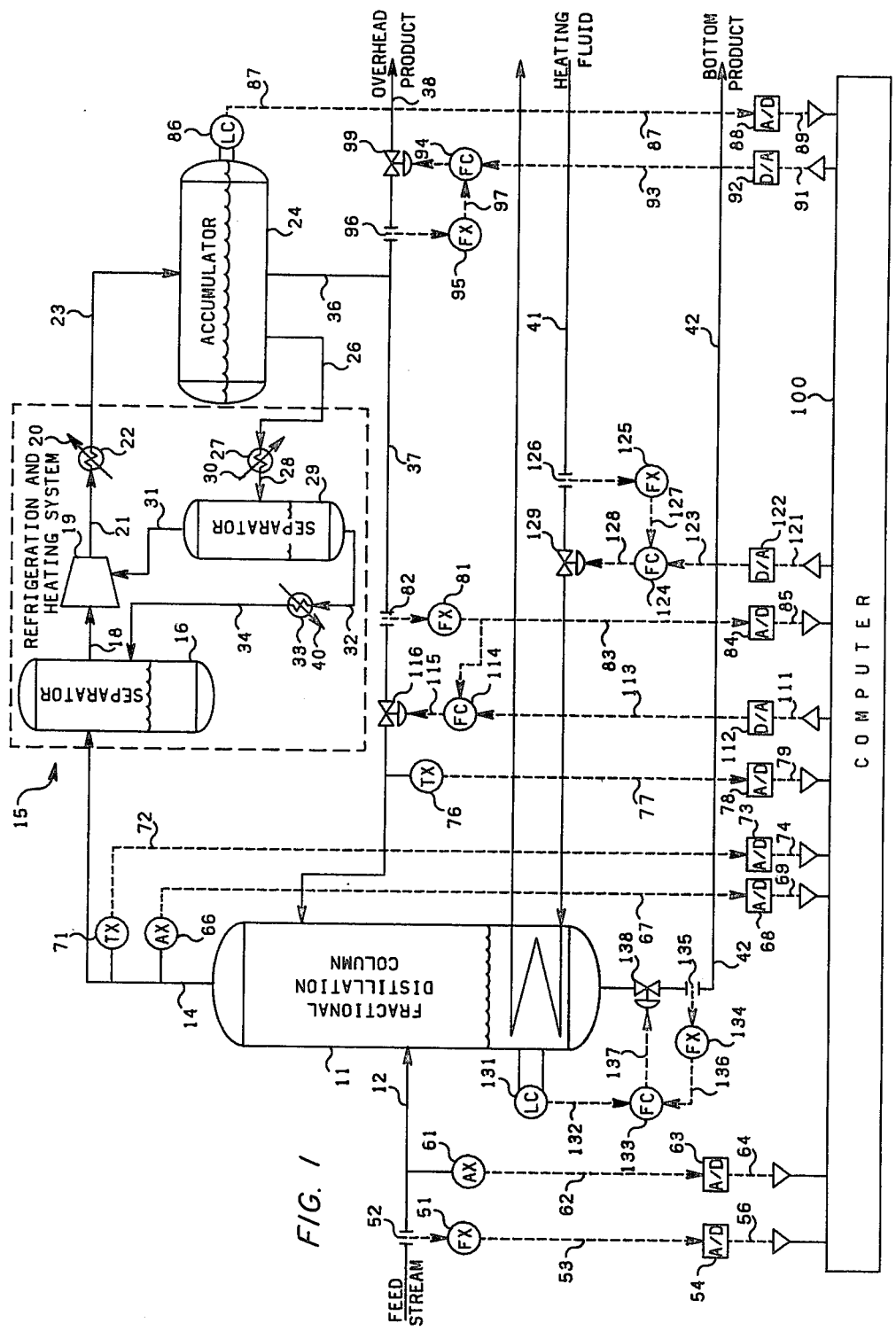
FIG. 1 is an illustration of a fractional distillation column and the associated control system for the fractional distillation column.

The invention is illustrated and described in terms of a ethylene manufacturing process and specifically in terms of the $C_2$ splitter column in an ethylene manufacturing process. The invention, however, is applicable to other manufacturing processes where it is desirable to use at least a portion of the overhead vapor stream to supply the cooling and heating requirements of a process with which the fractional distillation column is associated.

Although the invention is illustrated and described in terms of a specific fractionation column and a specific control system for the fractionation column, the invention is also applicable to different types and configurations of fractionation columns as well as different types of control system configurations which accomplish the purpose of the invention. Lines designated as signal lines in the drawings are electrical in this preferred embodiment. However, the invention is also applicable to pneumatic, mechanical, hydraulic or other signal means for transmitting information. In almost all control systems some combination of these types of signals will be used. However, use of any other type of signal transmission, compatible with the process and equipment in use is within the scope of the invention.

A digital computer is used in the preferred embodiment of this invention to calculate the required control signals based on measured process parameters as well as set points supplied to the computer. Analog computers or other types of computing devices could also be used in the invention.

Both the analog and digital controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is with the scope of the invention. The operation of proportional-integral controllers is well known in the art. The output control signal of a proportional-integral controller may be represented as $$S = K_1 E + K_2 \int E dt \text{ where}$$

S = output control signals;
E = difference between two input signals; and
$K_1$ and $K_2$ = constants.

The scaling of an output signal by a controller is well known in control systems art. Essentially, the output of a controller may be scaled to represent any desired factor or variable. An example of this is where a desired pressure and an actual pressure is compared by a controller. The output could be a signal representative of a desired change in the flow rate of some gas necessary to make the desired and actual pressures equal. On the other hand, the same output signal could be scaled to represent a percentage or could be scaled to represent a temperature change required to make the desired and actual pressures equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings and in particular to FIG. 1, a fractional distillation column 11 is illustrated. In the preferred embodiment of the present invention, the fractional distillation column 11 is a $C_2$ splitter associated with an ethylene manufacturing process. A feed stream is provided to the fractional distillation column 11 through conduit means 12. The feed stream is typically provided from the bottoms product of a demethanizer column associated with an ethylene manufacturing process. The feed stream will comprise primarily ethylene and ethane.

An overhead vapor stream is removed from the fractional distillation column through conduit means 14. The overhead vapor stream flowing through conduit means 14 will comprise primarily ethylene. The overhead vapor stream from the fractional distillation column 11 flowing through conduit means 14 is provided to the refrigeration and heating system 15 for the ethylene manufacturing process. In the refrigeration and heating system 15, the overhead vapor stream is first supplied to the separator 16 wherein any entrained liquid is permitted to settle out in the bottom of vessel 16 for subsequent vaporization. The denuded vapor is provided from the separator 16 through conduit means 18 to a compression system which is illustrated as compressor 19. The compression system 19 will typically comprise of a plurality of compressors with at least four compressors being utilized in a typical ethylene manufacturing process. From the compression system 19 the highly compressed overhead vapor stream from the fractional distillation column 11 will be supplied through a plurality of conduit means, of which conduit means 21 is illustrative, to a plurality of heat exchangers associated with the ethylene manufacturing process of which heat exchanger 22 is illustrative. The highly compressed overhead vapor stream will be utilized to supply heat to a plurality of streams, represented by conduit means 20, in the ethylene manufacturing process. From the plurality of heat exchangers, which are represented by heat exchanger 22, the overhead vapor stream, which will now be at least partially condensed, flows through a plurality of conduit means, of which conduit means 23 is illustrative, to the overhead accumulator 24.

From the overhead accumulator 24 a portion of the overhead condensate is withdrawn through conduit means 26 and is provided to a plurality of heat exchangers, associated with the ethylene manufacturing process, of which heat exchanger 27 is illustrative. This portion of the condensate from the accumulator 24 is utilized to cool a plurality of process streams, represented by conduit means 30, in the ethylene manufacturing process. From the plurality of heat exchangers, of which heat exchanger 27 is illustrative, this overhead condensate stream, which will now be at least partially in a vapor form, is provided through a plurality of conduits, of which conduit means 28 is illustrative, to the separator 29. From the separator 29 the vapor portion is provided through conduit means 31 to the compression system which is illustrated as compressor 19. The liquid portion from the separator 29 is provided through conduit means 32 to a plurality of heat exchangers, associated with the ethylene manufacturing process which are illustrated as heat exchanger 33. The liquid stream flowing through conduit means 32 can be utilized to cool other process streams, represented by conduit means 40, in the ethylene manufacturing process. From the plurality of heat exchangers, which are represented by heat exchanger 33, the ethylene stream, which will now be at least partially in vapor form, flows through a plurality of conduit means, which are illustrated by conduit means 34, to the separator 16. From the separator 16 the ethylene stream can again be recycled through the refrigeration and heating system 15 for the ethylene manufacturing process.

A portion of the overhead condensate is withdrawn from the accumulator 24 through conduit means 36. At least a portion of the overhead condensate flowing through conduit means 36 is returned to the fractional distillation column 11 through conduit means 37 as an external reflux to the fractional distillation column 11. A second portion of the overhead condensate flowing through conduit means 36 is withdrawn through conduit means 38 as an overhead product from the $C_2$ splitter column. The liquid overhead product flowing through conduit means 38 will be primarily ethylene which is the end product in the ethylene manufacturing process.

Heating fluid is provided to the fractional distillation column 11 through conduit means 41. The heating fluid is utilized to provide heat to the fractional distillation column 11 to effect the separation of the heavy and light components in the feed stream flowing through conduit means 12. A bottoms product will be typically withdrawn from the fractional distillation column 11 through conduit means 42. The bottoms product will be primarily ethane from the $C_2$ splitter column which is represented as the fractional distillation column 11.

The fractional distillation system described to this point is a conventional fractional distillation system such as would be found in a modern ethylene manufacturing process. It is the manner in which the fractional distillation system, illustrated in FIG. 1, is controlled so as to maintain a liquid level in the overhead accumulator 24 which will insure that sufficient overhead vapor is available to supply the requirements of the refrigeration and heating system 15 while still maintaining a desired overhead product composition which provides the novel features of the present invention.

Control of the fractional distillation system illustrated in FIG. 1 is generally accomplished by measuring a plurality of system parameters and supplying the measured parameters to computer means 100 which is preferably a digital computer. Computer means 100 is also supplied with a plurality of set point signals which are representative of desired operating characteristics for the fractional distillation system illustrated in FIG. 1. In response to the measured inputs and the set point signals, computer means 100 calculates the required flow rate for the heating fluid flowing through conduit means 41, the required flow rate for the overhead product flowing through conduit means 38 and the required flow rate for the external reflux flowing through conduit means 37.

Flow transducer 51, in combination with flow sensor 52, provides an output signal 53 which is representative of the flow rate of the feed stream flowing through conduit means 12 to the fractional distillation column 11. Signal 53 is provided from the flow transducer 51 to the analog-to-digital (A/D) converter 54. Signal 53 is converted from analog form to digital form by the A/D converter 54 and it is provided as signal 56 to the computer means 100.

The analyzer transducer 61, which is operably connected to the conduit means 12, provides an output signal 62 which is representative of the percentage of ethylene in the feed mixture flowing through conduit means 12. Preferably, the analyzer transducer 61 is a chromatographic analyzer. Signal 62 is provided from the analyzer transducer 61 to the A/D converter 63. Signal 62 is converted from analog form to digital form and is provided as signal 64 to computer means 100.

The analyzer transducer 66, which is operably connected to conduit means 14, provides an output signal 67 which is representative of the composition of the overhead vapor stream flowing through conduit means 14. The analyzer transducer 66 is preferably a chromatographic analyzer. Signal 67 is provided from the analyzer transducer 66 to the A/D converter 68. Signal 67 is converted from analog form to digital form by the A/D converter 68 and is provided as signal 69 to computer means 100.

Temperature transducer 71, in combination with a temperature measuring device such as a thermocouple which is operably located in conduit means 14, provides an output signal 72 which is representative of the temperature of the overhead product flowing through conduit means 14. Signal 72 is provided from temperature transducer 71 to the A/D converter 73. Signal 72 is converted from analog form to digital form by the A/D converter 73 and is provided as signal 74 to computer means 100.

Temperature transducer 76, in combination with a temperature measuring device such as a thermocouple which is operably located in conduit means 37, provides an output signal 77 which is representative of the temperature of the external reflux flowing through conduit means 37. Signal 77 is provided from temperature transducer 76 to the A/D converter 78. Signal 77 is converted from analog form to digital form by the A/D converter 78 and is provided as signal 79 to computer means 100.

Flow transducer 81, in combination with flow sensor 82, provides an output signal 83 which is representative of the flow rate of the external reflux flowing through conduit means 37 to the fractional distillation column 11. Signal 83 is provided from the flow transducer 81 to the A/D converter 84. Signal 83 is converted from analog form to digital form by the A/D converter 84 and is provided as signal 85 to computer means 100.

The level transducer 86 provides an output signal 87 which is representative of the liquid level in the overhead accumulator 24. Signal 87 is provided from the level transducer 86 to the A/D converter 88. Signal 87 is converted from analog form to digital form by the A/D converter 88 and is provided as signal 89 to the computer means 100.

In response to the described inputs, computer means 100 calculates three control signals which are utilized in controlling the fractional distillation process illustrated in FIG. 1. One control signal, calculated by computer means 100, is signal 91 which is representative of the required flow rate of the overhead product flowing through conduit means 38. Signal 91 is provided from the computer means 100 to the digital-to-analog (D/A) converter 92. Signal 91 is converted from digital to analog form by the D/A converter 92 and is provided as signal 93 to the flow controller 94. The flow transducer 95, in combination with the flow sensor 96, provides an output signal 97 which is representative of the flow rate of the overhead product flowing through conduit means 38. Signal 97 is provided from the flow transducer 95 as a second input to the flow controller 94. In response to signals 93 and 97, the flow controller 94 provides an output signal 98 which is responsive to the difference between signals 93 and 97. Signal 98 is provided from the flow controller 94 to the pneumatic control valve 99 which is operably located in conduit means 38. Signal 98 is utilized to actuate the pneumatic control valve 99. The pneumatic control valve 99 is thus manipulated in response to signal 98 to thereby varu the flow rate of the overhead product flowing through conduit means 38 at the currently desired level.

A second control signal 111, which is provided from the computer means 100, is representative of the required flow rate of the external reflux flowing through conduit means 37 to the fractional distillation column 11. Signal 111 is provided from computer means 100 to the D/A converter 112. Signal 111 is converted from digital to analog form by the D/A converter 112 and is provided as signal 113 to the flow controller 114. The flow controller 114 is also provided with the output signal 83, from the flow transducer 81, which is representative of the flow rate of the external reflux flowing through conduit means 37. In response to signals 113 and 83, the flow controller 114 provides an output signal 115 which is responsive to the difference between signals 113 and 83. Signal 115 is provided from the flow controller 114 to the pneumatic control valve 116 which is operably located in conduit means 37. Signal 115 is utilized to actuate the pneumatic control valve 116. The pneumatic control valve 116 is thus manipulated in response to signal 115 to thereby vary the flow rate of the external reflux flowing through conduit means 37 at a desired level.

A third control signal, calculated by computer means 100, is signal 121 which is representative of the required flow rate of the heating fluid flowing through conduit means 41. Signal 121 is provided from the computer means 100 to the digital-to-analog (D/A) converter 122. Signal 121 is converted from digital to analog form by the D/A converter 122 and is provided as signal 123 to the flow controller 124. The flow transducer 125, in combination with the flow sensor 126, provides an output signal 127 which is representative of the flow rate of the overhead product flowing through conduit means 41. Signal 127 is provided from the flow transducer 125 as a second input to the flow controller 124. In response to signals 123 and 127, the flow controller 124 provides an output signal 98 which is responsive to the difference between signals 123 and 127. Signal 128 is provided from the flow controller 124 to the pneumatic control valve 129 which is operably located in conduit means 41. Signal 128 is utilized to actuate the pneumatic control valve 129. The pneumatic control valve 129 is thus manipulated in response to signal 128 to thereby vary the flow rate of the heating fluid flowing through conduit means 38 at a desired level.

The flow rate of the bottoms product through conduit means 42 can be controlled so as to maintain a desired liquid level in the bottom of the fractional distillation column 11. This can be accomplished by utilizing the level controller 131 to provide an output signal 132 which can be scaled so as to be representative of the desired flow rate for the bottoms product flowing through conduit means 42 required to maintain a desired liquid level in the bottom of the fractional distillation column 11. Signal 132 is provided from the level controller 131 as a first input to the flow controller 133. The flow transducer 134, in combination with the flow sensor 135, provides an output signal 136 which is representative of the actual flow rate of the bottoms product flowing through conduit means 42. Signal 136 is provided from the flow transducer 134 as a second input to the flow controller 133. In response to signals 132 and 136, the flow controller 133 provides an output signal 137 which is responsive to the difference between signals 132 and 136. Signal 137 is provided from the flow controller 133 to the pneumatic control valve 138 which is operably located in conduit means 42. The control signal 137 is utilized to actuate the pneumatic control valve 138. The pneumatic control valve 138 is thus manipulated in response to signal 137 to thereby vary the flow rate of the bottoms product flowing through conduit means 42 as necessary to maintain the desired liquid level in the bottom of the fractional distillation column 11.

Figure 2:
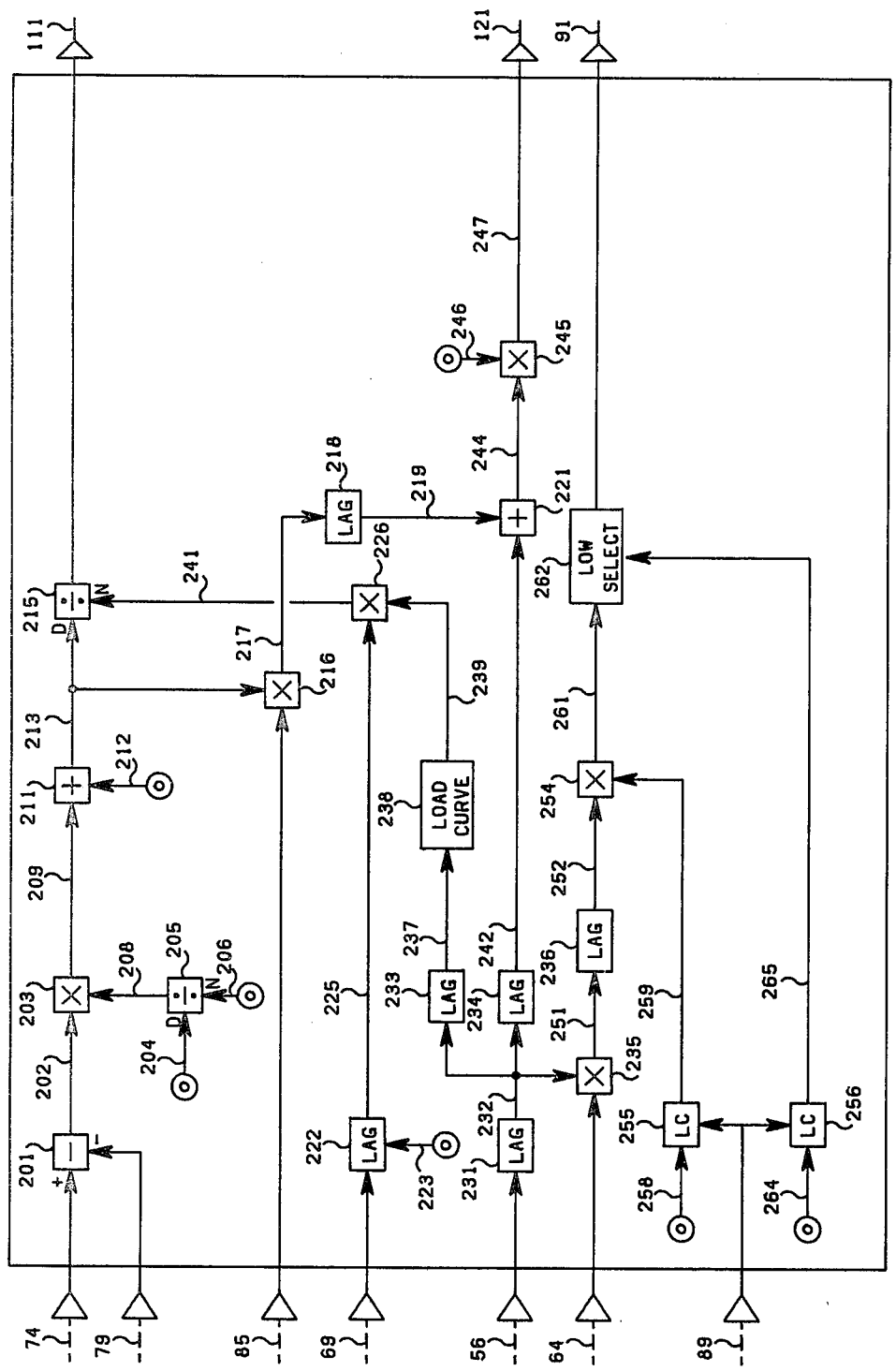
FIG. 2 is a flow diagram of a computer logic to generate the control signals utilized to control the fractional distillation column illustrated in FIG. 1.

A logic flow diagram which can be utilized to calculate the control signals 91, 111 and 121 in response to the previously described input signals to the computer means 100 is illustrated in FIG. 2. Referring now to FIG. 2, signal 74, which is representative of the temperature ($T_V$) of the overhead vapor stream flowing through conduit means 14, is provided as a first input to the subtracting block 201. Signal 79, which is representative of the temperature ($T_R$) of the external reflux flowing through conduit means 37 to the fractional distillation column 11, is provided as a second input to the subtracting block 201. Signal 79 is subtracted from signal 74 to provide signal 202 which is representative of $T_V-T_R$. Signal 202 is provided from the subtracting block 201 as a first input to the multiplying block 203.

Signal 204, which is representative of the heat vaporization ($C_P$) of the external reflux flowing through conduit means 37 to the fractional distillation column 11, is provided as a first input to the dividing means 205. Signal 206, which is representative of the specific heat ($H_R$) of the external reflux flowing through conduit means 37, is provided as a second input to the dividing block 205. Signal 206 is divided by signal 204 to provide signal 208 which is representative of $C_P/H_R$. Signal 208 is provided from the dividing block 205 as a second input to the multiplying block 203. Signal 202 is multiplied by signal 208 to provide signal 209 which is representative of $(C_P/H_R)(T_V-T_R)$. Signal 209 is provided from the multiplying block 203 as a first input to the summing block 211. The summing block 211 is also provided with signal 212 which is representative of the constant $+1$. Signal 212 is summed with signal 209 to provide signal 213 which is representative of $1+(C_P/H_R)(T_V-T_R)$. Signal 213 is provided from the summing block 211 as a first input to the dividing block 215 and as a first input to the multiplying block 216.

Signal 85, which is representative of the flow rate of the external reflux flowing through conduit means 37 to the fractional distillation column 11, is provided as a second input to the multiplying block 216. Signal 213 is multiplied by signal 85 to provide signal 217 which is representative of the internal reflux flow rate in the fractional distillation column 11 produced by the external reflux flowing through conduit means 37. Signal 217 is provided from the multiplying block 216 to the lag block 218. The lag block 218 is provided to account for the time delay required for the propagation of the internal reflux from the top of the fractional distillation column to the bottom of the fractional distillation column. Signal 219 is thus a prediction of what the flow rate of the internal reflux will be at the bottom of the fractional distillation column 11 at a future time. If signal 217 is considered to be a measurement of the internal reflux flow rate at the top of the fractional distillation column at a time $T_1$ then signal 219 could be considered to be a prediction of the flow rate of the internal reflux at the bottom of the fractional distillation column at a time $T_2$ where the time $T_2$ is later in time than the time $T_1$. Signal 219 is provided from the lag block 218 as a first input to the summing block 221.

Signal 69, which is representative of the composition of the overhead vapor stream flowing through conduit means 14, is provided as a first input to the analyzer controller 222. The analyzer controller 222 is a digital implementation of the typical analog proportional-integral controller. The analyzer controller 222 is also provided with signal 223 which is representative of the desired composition of the overhead vapor stream flowing to conduit means 14. In response to signals 69 and 223, the analyzer controller 222 provides an output signal 225 which is responsive to the difference between signals 69 and 223. Signal 225 is supplied from the analyzer controller 222 as a first input to the multiplying block 226.

Signal 56, which is representative of the feed flow rate to the fractional distillation column 11, is provided as an input to the lag block 231. The output signal 237 from the lag block 223 is provided as an input to the load curve block 238. The plurality of lag blocks 231, 233, 234 and 236 are utilized in the same manner as the lag block 218 which has been previously described. The lag blocks are utilized simply to delay a signal by some time constant. Signal 237 from the lag block 233 is delayed by a time constant representative of the time that it would take for a change in the feed flow rate to affect the overhead product composition.

Figure 3:
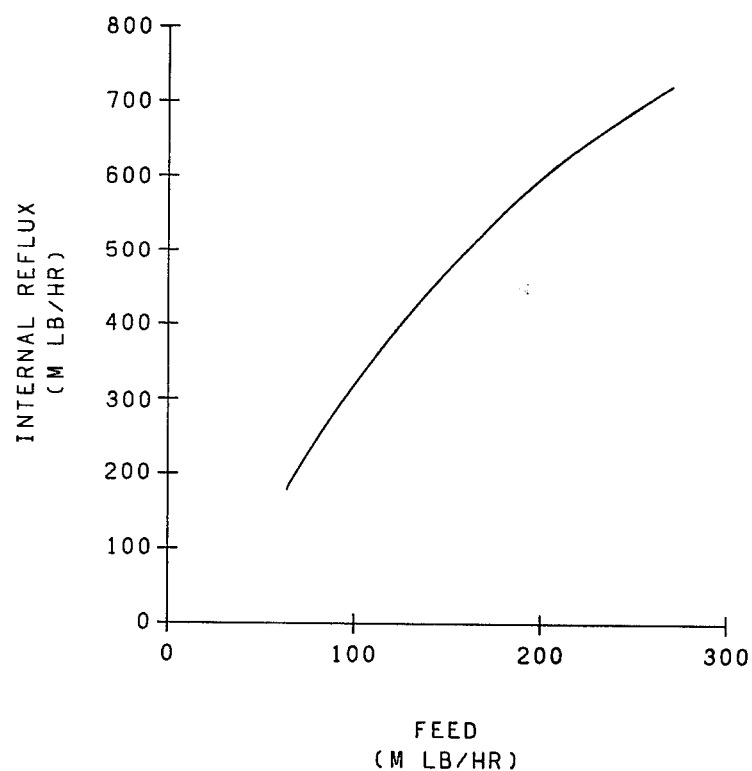
FIG. 3 is a plot of the internal reflux flow rate for the fractional distillation column as a function of the feed rate to the fractional distillation column.

A typical load curve which could be used for the load curve 238 is illustrated in FIG. 3. The load curve represents a plot of the internal reflux flow rate for the fractional distillation column 11 as a function of the feed flow rate to the fractional distillation column 11. The output signal 239 from the load curve 238 is thus a prediction of the required internal reflux flow rate necessary to maintain a desired product composition. Signal 239 is provided from the load curve block 238 as a second input to the multiplying block 226. Signal 239 is biased by signal 225 in the multiplying block 226 to produce signal 241 which is representative of the required internal reflux flow rate necessary to maintain a desired overhead product composition. Signal 239 may be thought of as the feedforward portion of the control for the external reflux flow rate with signal 225 being thought of as the feedback portion of the control for the external reflux flow rate. Signal 241 is provided from the multiplying block 226 as a second input to the dividing block 215. Signal 241 is divided by signal 213 to produce signal 111 which is representative of the required flow rate for the external reflux flowing through conduit means 37 to the fractional distillation column 11 necessary to maintain a desired overhead product composition. Signal 111 is provided from the dividing block 215 as an output from computer means 100 and is utilized as previously described.

The output signal 242 from the lag block 234 is representative of the feed flow rate to the fractional distillation olumn 11 delayed by the time required for a change in the feed flow rate to the fractional distillation column 11 to effect a change in the flow rate of the bottoms product flowing through conduit means 42. Signal 242 is provided from the lag block 234 as a second input to the summing block 221. Signal 242 and signal 219 are summed to provide signal 244. Signal 244 is provided from the summing block 221 as a first input to the multiplying block 245. The multiplying block 245 is also provided with signal 246 which is representative of a gain term. The output signal 247 from the multiplying block 245 is representative of the required flow rate for the heating fluid flowing through conduit means 41 to supply sufficient heat to the fractional distillation column 11 to maintain a desired overhead product composition. Signal 242 provides a means by which changes in the feed rate to the fractional distillation column can effect changes in the flow rate of the heating fluid flowing through conduit means 41. Signal 219 provides a means by which changes in the internal reflux flow rate for the fractional distillation column 11 can effect a change in the flow rate of the heating fluid flowing to the fractional distillation column 11 through conduit means 41. The gain term represented by signal 246 will generally vary from a factor of 1.5 to a factor of 2.0 for a $C_2$ splitter in a typical ethylene manufacturing process.

Signal 64, which is representative of the percentage of ethylene in the feed stream flowing through conduit means 12 to the fractional distillation column 11, is provided as a second input to the multiplying block 235. The output signal 251 from the multiplying block 235 will thus be representative of the flow rate of ethylene into the fractional distillaton column delayed by the time constant represented by the lag block 231. Signal 251 is provided from the multiplying block 235 to the lag block 236. The output signal 252 from the lag block 236 will be representative of the flow rate of ethylene into the fractional distillation column 11 delayed by the time which would be required for the ethylene in the feed stream flowing through conduit means 12 to propagate to the upper portion of the fractional distillation column 11. Signal 252 will essentially be a prediction of the flow rate of the overhead vapor stream flowing through conduit means 14 at a future time. Signal 252 is provided from the lag block 236 as a first input to the multiplying block 254.

Signal 89, which is representative of the actual liquid level in the overhead accumulator 24, is provided as a first input to the level controller 255 and the level controller 256. The level controller 255 and the level controller 256 are digital implementation of a typical proportional-integral analog level controller. The level controller 255 is supplied with a set point signal 258 which is representative of the desired liquid level in the overhead accumulator 24. In response to signals 89 and 258, the level controller 255 provides an output signal 259 which is responsive to the difference between signals 89 and 258. Signal 259 is provided as a second input to the multiplying block 254. Signal 259 may be thought of as being representative of the percentage of the ethylene in the overhead vapor stream which may be withdrawn from the overhead accumulator 24 as liquid overhead product while still maintaining a desired liquid level in the overhead accumulator 24.

Signal 252 is multiplied by signal 259 in the multiplying block 254 to provide signal 261. Signal 261 is representative of the desired flow rate for the overhead product flowing through conduit means 38 which will maintain a liquid level in the overhead accumulator 24 which is sufficient to supply the refrigeration and heating requirements of the refrigeration and heating system 15 illustrated in FIG. 1. Signal 261 is provided from the multiplying block 254 as a first input to the low select block 262.

Level controller 256 is provided with a set point signal 264 which is representative of the lowest liquid level allowable for the overhead accumulator 24. In response to signals 264 and 89, the level controller 256 provides an output signal 265 which is responsive to the difference between signals 89 and 264. Signal 265 is scaled so as to be representative of the required flow rate for the overhead product flowing through conduit means 38 necessary to maintain the liquid level in the overhead accumulator 24 which is represented by signal 264. Signal 265 is provided from the level controller 256 as a second input to the low select 262. The low select block 262 selects either 261 or signal 265, depending on which signal is the lower, and provides the output signal 91 representative of the required flow rate of the overhead product flowing through conduit means 38.

The level controller 255 is tuned so that it responds slowly to changes in the liquid level in the overhead accumulator 24 so as to provide a smooth stable response to changes in the liquid level in the overhead accumulator 24. In contrast, the level controller 256 is tuned so as to provide a very quick response to changes in the liquid level in the overhead accumulator 24. The level controller 256 is thus utilized to provide a safety feature. The desired overhead accumulator liquid level set point represented by signal 258 will generally represent a higher liquid level than that represented by the low limit liquid level set point 264. Generally, if the control system is functioning properly, the level controller 255 will be essentially controlling the flow rate of the overhead product flowing through conduit means 38 and signal 261 will be selected by the low select 262 to be provided as the output signal 91 from computer means 100. Only at such times when there is a malfunction in the control system or fluctuations occur in either the heat flow rate to the fractional distillation column 11 or in the liquid level in the overhead accumulator 24 which the control system is not capable of handling will the level controller 256 be allowed to assume control of the flow rate of the overhead product flow through conduit means 38. In this manner, a sufficient liquid level is maintained in the overhead accumulator 24 to satisfy the requirements of the refrigeration and heating system 15 even where severe system upsets or control system malfunctions occur.

The control system illustrated in FIGS. 1 and 2 provide both feedforward and feedback control of the flow rate of the external reflux fluid and the flow rate of the heating fluid. Feedforward control is provided by utilizing the feed flow rate and the analysis of the feed to provide the predictive feedforward terms with the analysis on the overhead plus the temperature of the overhead, the temperature of the external reflux and the flow rate of the external reflux being utilized to provide the feedback terms utilized in the control system.

Feedforward control of the overhead product flow through conduit means 38 is provided by the combination of the analysis of the feed to the fractional distillation column 11 as well as the measurement of the feed flow rate to the fractional distillation column 11. Feedback control of the overhead product flow through conduit means 38 is provided by the actual measurement of the liquid level in the overhead accumulator 24. Protection is provided for maintaining a required liquid level in the overhead accumulator 24 by utilizing a comparison of a low limit for the liquid level in the overhead accumulator 24 to the actual liquid level in the overhead accumulator 24 to override the primary control system when required to compensate for extreme fluctuations or to compensate for control system malfunctions.

The invention has been described in terms of a preferred embodiment as illustrated in FIGS. 1-3. Specific components used in the practice of the invention as illustrated in FIG. 1 such as flow sensors 52, 82, 96, 126 and 135; flow transducers 51, 95, 81, 125 and 134; flow controllers 133, 114, 94, 124, and 133; level controller 131; level transducer 86; pneumatic control valves 116, 99, 129 and 138; and temperature transducers 71 and 76 are each well known commercially available control components such as are described at length in *Perry's Chemical Engineers Handbook,* 4th Edition, Chapter 22, McGraw-Hill.

Other components not previously specified are as follows:

| | |
|---|---|
| A/D converters 34, 63, 68, 73, 78, 84 and 88 | MM5357 8-Bit A/D Converter, National Semiconductor, Inc. |
| Digital-to-analog converters 92, 122, and 112 | AD559 8-Bit D/A Converter, Analog Devices, Inc. |
| Analyzer transducers 61 and 66 | Optichrom ® 2100 Process Chromatographic Analyzer, Applied Automation, Inc. |
| Computer 100 | Optrol 3600, Applied Automation, Inc. |

For reasons of brevity, conventional auxiliary fractionation equipment such as pumps, heat exchangers, additional measurement-control devices, etc., have not been included in the above description as they play no part in the explanation of the invention.

While the invention has been described in terms of the presently preferred embodiments, reasonable variations and modifications are possible by those skilled in the art within the scope of the described invention and the appended claims. Variations such as using an analog computer to perform the required calculations is within the scope of the invention.

That which is claimed is:

1. Apparatus comprising:

a fractional distillation column means;

first conduit means for passing a feed mixture into said fractional distillation column means;

second conduit means for passing a heating fluid into said fractional distillation column means to thereby supply at least a portion of the heat required to effect the separation of said feed mixture;

third conduit means for withdrawing said heating fluid from said fractional distillation column means;

fourth conduit means for withdrawing an overhead vapor stream from an upper portion of said fractional distillation column means;

means for condensing at least a portion of said overhead vapor stream;

accumulator means;

means for passing the resulting at least partially condensed overhead stream into said accumulator means;

fifth conduit means for withdrawing condensate from said accumulator means and for passing a first portion of the thus withdrawn condensate into an upper portion of said fractional distillation column means as an external reflux stream therefor and for passing a second portion of the thus withdrawn condensate as an overhead product stream;

means for establishing a first signal representative of the predicted flow rate of said overhead vapor stream at a time $T_1$;

means for establishing a second signal representative of the percentage of said overhead vapor stream which can be removed from said accumulator means as said overhead product stream while still maintaining a desired liquid level in said accumulator means;

means for combining said first signal and said second signal to produce a third signal representative of the desired flow rate of said overhead product stream;

means for establishing a fourth signal representative of the highest allowable flow rate of said overhead product stream;

a low select means having at least first and second inputs and at least one output;

means for providing said third signal to the first input of said low select means;

means for providing said fourth signal to the second input of said low select means, the one of said third and fourth signals representative of the lowest flow rate of said overhead product stream being supplied as a fifth signal from the at least one output of said low select means; and means for manipulating the flow rate of said overhead product stream in response to said fifth signal.

2. Apparatus in accordance with claim 1 wherein said means for condensing at least a portion of said overhead vapor stream comprises a heating system for a process.

3. Apparatus in accordance with claim 2 additionally comprising sixth conduit means for withdrawing condensate from said accumulator means and for passing the thus withdrawn condensate into a refrigeration system for a process.

4. Apparatus in accordance with claim 3 wherein said desired liquid level in said accumulator means is a level which will insure that adequate condensate is available to supply the needs of said refrigeration system.

5. Apparatus in accordance with claim 4 wherein said means for establishing said first signal comprises:
means for establishing a sixth signal representative of the flow rate of said feed mixture passing into said fractional distillation column means at a time $T_2$ where said time $T_2$ is earlier in time than said time $T_1$;
means for establishing a seventh signal representative of the percentage of said feed mixture which is made up of light components which will make up said overhead vapor stream;
means for multiplying said sixth signal by said seventh signal to thereby establish an eighth signal representative of the flow rate of said light components into said fractional distillation column means at said time $T_2$;
a delay means; and
means for providing said eighth signal to said delay means to thereby establish said first signal.

6. Apparatus in accordance with claim 5 wherein the time period $T_1 - T_2$ is representative of the time required for a change in the flow rate of said feed mixture to cause a change in the flow rate of said overhead vapor stream.

7. Apparatus in accordance with claim 5 wherein said means for establishing said second signal comprises:
means for establishing a seventh signal representative of the actual liquid level in said accumulator means;
means for establishing an eighth signal representative of the desired liquid level in said accumulator means; and
means for comparing said seventh signal and said eighth signal and for establishing said second signal responsive to the difference between said seventh signal and said eighth signal.

8. Apparatus in accordance with claim 7 wherein said means for combining said first signal and said second signal comprises a multiplying means.

9. Apparatus in accordance with claim 7 wherein said means for establishing said fourth signal comprises:
means for establishing a ninth signal representative of the lowest level allowable for the liquid level in said accumulator means; and
means for comparing said seventh signal and said ninth signal and for establishing said fourth signal responsive to the difference between said seventh signal and said ninth signal.

10. Apparatus in accordance with claim 9 wherein said means for controlling the flow rate of said overhead product stream in response to said fifth signal comprises:
means for establishing a tenth signal representative of the actual flow rate of said overhead product stream;
means for comparing said fifth signal and said tenth signal and for providing an eleventh signal responsive to the difference between said fifth signal and said tenth signal; and
means for manipulating the flow rate of said overhead product stream in response to said eleventh signal.

11. Apparatus in accordance with claim 1 additionally comprising:
means for establishing a sixth signal representative of the actual temperature of said overhead vapor stream $(T_V)$;
means for establishing a seventh signal representative of the temperature of said external reflux stream $(T_R)$;
means for subtracting said seventh signal from said sixth signal to produce an eighth signal representative of $T_V - T_R$;
means for establishing a ninth signal representative of the specific heat of said external reflux stream $(C_P)$;
means for establishing a tenth signal representative of the heat of vaporization of said external reflux stream $(H_R)$;
means for dividing said ninth signal by said tenth signal to produce an eleventh signal representative of $C_P/H_R$;
means for multiplying said eighth signal by said eleventh signal to produce a twelfth signal representative of $(T_V - T_R)(C_P/H_R)$;
means for establishing a thirteenth signal representative of the constant $+1$;
means for summing said thirteenth signal and said twelfth signal and for producing a fourteenth signal representative of $1 + (T_V - T_R)(C_P/H_R)$;
means for establishing a fifteenth signal representative of the internal reflux flow rate for said fractional distillation column means necessary to maintain a desired overhead product composition;
means for dividing said fourteenth signal by said fifteenth signal to produce a sixteenth signal representative of the desired flow rate for said external reflux stream; and
means for controlling the flow rate of said external reflux stream in response to said sixteenth signal.

12. Apparatus in accordance with claim 11 wherein said means for establishing said fifteenth signal comprises:
means for establishing a seventeenth signal representative of the flow rate of said feed mixture into said fractional distillation column means at a time $T_2$;
a delay means;
means for providing said seventeenth signal to said delay means to thereby establish an eighteenth signal representative of the flow rate of said feed mixture at a time $T_3$ where the time period represented by $T_3 - T_2$ is the period of time required for a change in the flow rate of the feed mixture to cause a change in the flow rate of the internal reflux inside said fractional distillation column means;
means for establishing, in response to said eighteenth signal, a nineteenth signal representative of the internal reflux flow rate in said fractional distillation column means at said time $T_3$;
means for establishing a twentieth signal representative of the composition of said overhead vapor stream;
means for establishing a twenty-first signal representative of the desired composition of said overhead vapor stream;
means for comparing said twentieth signal and said twenty-first signal and for establishing a twenty-second signal responsive to the difference between said twentieth and twenty-first signal; and means for combining said nineteenth signal and said twenty-second signal to thereby establish said fifteenth signal.

13. Apparatus in accordance with claim 12 wherein said means for establishing said nineteenth signal in response to said eighteenth signal comprises means for deriving the internal reflux flow rate for said fractional distillation column means as a function of the flow rate of said feed mixture to said fractional distillation column means.

14. Apparatus in accordance with claim 1 additionally comprising:

sixth conduit means for withdrawing a bottoms product stream from a lower portion of said fractional distillation column means;

means for establishing a sixth signal representative of the flow rate of said feed mixture flowing to said fractional distillation column means at a time $T_2$;

a first delay means;

means for supplying said sixth signal to said first delay means to thereby establish a seventh signal representative of the flow rate of said feed mixture at a time $T_3$ where the time period $T_3-T_2$ is representative of the time required for a change in the flow rate of said feed mixture to cause a change in the flow rate of said bottoms product stream;

means for establishing an eighth signal representative of the temperature of said overhead vapor stream $(T_V)$;

means for establishing a ninth signal representative of the temperature of said external reflux stream $(T_R)$;

means for subtracting said ninth signal from said eighth signal to establish a tenth signal representative of $T_V-T_R$;

means for establishing an eleventh signal representative of the specific heat of said external reflux stream $(C_P)$;

means for establishing a twelfth signal representative of the heat of vaporization of said external reflux stream $(H_R)$;

means for dividing said eleventh signal by said twelfth signal to establish a thirteenth signal representative of $C_P/H_R$;

means for multiplying said thirteenth signal by said tenth signal to establish a fourteenth signal representative of $(T_V-T_R)(C_P/H_R)$;

means for establishing a fifteenth signal representative of the constant+1;

means for summing said fourteenth signal and said fifteenth signal and for establishing a sixteenth signal representative of $1+(T_V-T_R)(C_P/H_R)$;

means for establishing a seventeenth signal representative of the actual flow rate of said external reflux stream;

means for multiplying said seventeenth signal by said sixteenth signal to produce an eighteenth signal representative of the actual flow rate of the internal reflux in said fractional distillation column means at a time $T_4$;

a second delay means;

means for providing said eighteenth signal to said second delay means to thereby establish a nineteenth signal representative of the flow rate of said internal reflux at a time $T_5$ where the time period $T_5-T_4$ is representative of the time required for a change in the flow rate of said internal reflux to cause a change in the flow rate of said bottoms product stream;

means for combining said seventh signal and said nineteenth signal to thereby establish a twentieth signal representative of the desired flow rate of said heating fluid into said fractional distillation column means; and means for manipulating the flow rate of said heating fluid into said fractional distillation column means in response to said twentieth signal.

15. Apparatus in accordance with claim 14 wherein said means for manipulating the flow rate of said heating fluid flowing into said fractional distillation column means in response to said twentieth signal comprises:

means for establishing a twenty-first signal representative of the actual flow rate of said heating fluid;

means for comparing said twentieth signal and said twenty-first signal and for establishing a twenty-second signal responsive to the difference between said twentieth signal and said twenty-first signal; and means for manipulating the flow rate of said heating fluid in response to said twenty-second signal.

16. Apparatus in accordance with claim 1 additionally comprising:

sixth conduit means for withdrawing a bottoms product stream from a lower portion of said fractional distillation column means;

means for establishing a sixth signal representative of the flow rate of said bottoms product stream required to maintain a desired level in a lower portion of said fractional distillation column means;

means for establishing a seventh signal representative of the actual flow rate of said bottoms product stream;

means for comparing said sixth signal and said seventh signal and for establishing an eighth signal responsive to the difference between said sixth signal and said seventh signal; and means for manipulating the flow rate of said bottoms product stream in response to said eighth signal.

17. A method for controlling a fractional distillation column comprising the steps of:

passing a feed mixture to be separated into said fractional distillation column;

passing a heating fluid into said fractional distillation column to thereby supply at least a portion of the heat required to effect the separation of said feed mixture;

withdrawing said heating fluid from said fractional distillation column;

withdrawing an overhead vapor stream from an upper portion of said fractional distillation column;

condensing at least a portion of said overhead vapor stream;

passing the resulting at least partially condensed overhead stream into an accumulator;

withdrawing condensate from said accumulator and passing a first portion of the thus withdrawn condensate into an upper portion of said fractional distillation column as an external reflux stream therefor and passing a second portion of the thus withdrawn condensate as an overhead product stream;

establishing a first signal representative of the predicted flow rate of said overhead vapor stream at a time $T_1$;

establishing a second signal representative of the percentage of said overhead vapor stream which can be removed from said accumulator as said overhead product stream while still maintaining a desired liquid level in said accumulator;

combining said first signal and said second signal to produce a third signal representative of the desired flow rate of said overhead product stream;

establishing a fourth signal representative of the highest allowable flow rate of said overhead product stream;

providing the one of said third and fourth signals representative of the lowest flow rate of said overhead product stream as a fifth signal to a means for manipulating the flow rate of said overhead product stream to thereby control the flow rate of said overhead product stream in response to said fifth signal.

18. A method in accordance with claim 17 wherein said step of condensing at least a portion of said overhead vapor stream comprises supplying at least a portion of said overhead vapor stream to a heating system for a process.

19. A method in accordance with claim 18 additionally comprising the step of withdrawing condensate from said accumulator and passing the thus withdrawn condensate into a refrigeration system for a process.

20. A method in accordance with claim 19 wherein said desired liquid level in said accumulator is a level which will insure that adequate condensate is available to supply the needs of said refrigeration system.

21. A method in accordance with claim 20 wherein said step of establishing said first signal comprises:
establishing a sixth signal representative of the flow rate of said feed mixture passing into said fractional distillation column at a time $T_2$ where said time $T_2$ is earlier in time than said time $T_1$;

establishing a seventh signal representative of the percentage of said feed mixture which is made up of light components which will make up said overhead vapor stream;

multiplying said sixth signal by said seventh signal to thereby establish an eighth signal representative of the flow rate of said light components into said fractional distillation column means at said time $T_2$; and delaying said eighth signal to thereby establish said first signal.

22. A method in accordance with claim 21 wherein the time period $T_1-T_2$ is representative of the time required for a change in the flow rate of said feed mixture to cause a change in the flow rate of said overhead vapor stream.

23. A method in accordance with claim 21 wherein said step of establishing said second signal comprises:
establishing a seventh signal representative of the actual liquid level in said accumulator;
establishing an eighth signal representative of the desired liquid level in said accumulator; and
comparing said seventh signal and said eighth signal and establishing said second signal responsive to the difference between said seventh signal and said eighth signal.

24. A method in accordance with claim 23 wherein said step of combining said first signal and said second signal comprises multiplying said first signal and said second signal.

25. A method in accordance with claim 23 wherein said step of establishing said fourth signal comprises:
establishing a ninth signal representative of the lowest level allowable for the liquid level in said accumulator; and
comparing said seventh signal and said ninth signal and for establishing said fourth signal responsive to the difference between said seventh signal and said ninth signal.

26. A method in accordance with claim 25 wherein said step of controlling the flow rate of said overhead product stream in response to said fifth signal comprises:
establishing a tenth signal representative of the actual flow rate of said overhead product stream;
comparing said fifth signal and said tenth signal and providing an eleventh signal responsive to the difference between said fifth signal and said tenth signal; and
manipulating the flow rate of said overhead product stream in response to said eleventh signal.

27. A method in accordance with claim 17 additionally comprising the steps of:
establishing a sixth signal representative of the temperature of said overhead vapor stream ($T_V$);
establishing a seventh signal representative of the temperature of said external reflux stream ($T_R$);
subtracting said seventh signal from said sixth signal to produce an eighth signal representative of $T_V-T_R$;
establishing a ninth signal representative of the specific heat of said external reflux stream ($C_P$);
establishing a tenth signal representative of the heat of vaporization of said external reflux stream ($H_R$);
dividing said ninth signal by said tenth signal to produce an eleventh signal representative of $T_V/H_R$;
multiplying said eighth signal by said eleventh signal to produce a twelfth signal representative of $(T_V-T_R)(C_P/H_R)$;
establishing a thirteenth signal representative of the constant $+1$;
summing said thirteenth signal and said twelfth signal and for producing a fourteenth signal representative of $1+(T_V-T_R)(C_P/H_R)$;
establishing a fifteenth signal representative of the internal reflux flow rate for said fractional distillation column necessary to maintain a desired overhead product composition;
dividing said fourteenth signal by said fifteenth signal to produce a sixteenth signal representative of the desired flow rate for said external reflux stream; and
manipulating the flow rate of said external reflux stream in response to said sixteenth signal.

28. A method in accordance with claim 27 wherein said step of establishing said fifteenth signal comprises:
establishing a seventeenth signal representative of the flow rate of said feed mixture into said fractional distillation column at a time $T_2$;
delaying said seventeenth signal to thereby establish an eighteenth signal representative of the flow rate of said feed mixture at a time $T_3$ where the time period represented by $T_3-T_2$ is the period of time required for a change in the flow rate of the feed mixture to cause a change in the flow rate of the internal reflux inside said fractional distillation column;

establishing, in response to said eighteenth signal, a nineteenth signal representative of the internal reflux flow rate in said fractional distillation column at said time $T_3$;

establishing a twentieth signal representative of the composition of said overhead vapor stream;

establishing a twenty-first signal representative of the desired composition of said overhead vapor stream;

comparing said twentieth signal and said twenty-first signal and establishing a twenty-second signal responsive to the difference between said twentieth and twenty-first signal; and combining said nineteenth signal and said twenty-second signal to thereby establish said fifteenth signal.

29. A method in accordance with claim 28 wherein said step of establishing said nineteenth signal in response to said eighteenth signal comprises comparing the flow rate of said feed mixture at said time $T_3$ to a plot of the internal reflux flow rate for said fractional distillation column as a function of the flow rate of said feed mixture to said fractional distillation column.

30. A method in accordance with claim 17 additionally comprising the steps of:

withdrawing a bottoms product stream from a lower portion of said fractional distillation column;

establishing a sixth signal representative of the flow rate of said feed mixture flowing to said fractional distillation column at a time $T_2$;

delaying said sixth signal to thereby establish a seventh signal representative of the flow rate of said feed mixture at a time $T_3$ where the time period $T_3 - T_2$ is representative of the time required for a change in the flow rate of said feed mixture to cause a change in the flow rate of said bottoms product stream;

establishing an eighth signal representative of the temperature of said overhead vapor stream ($T_V$);

establishing a ninth signal representative of the temperature of said external reflux stream ($T_R$);

subtracting said ninth signal from said eighth signal to establish a tenth signal representative of $T_V - T_R$;

establishing an eleventh signal representative of the specific heat of said external reflux stream ($C_P$);

establishing a twelfth signal representative of the heat of varporization of said external reflux stream ($H_R$);

dividing said eleventh signal by said twelfth signal to establish a thirteenth signal representative of $C_P/H_R$;

multiplying said thirteenth signal by said tenth signal to establish a fourteenth signal representative of $(T_V - T_R)(C_P/H_R)$;

establishing a fifteenth signal representative of the constant + 1;

summing said fourteenth signal and said fifteenth signal and for establishing a sixteenth signal representative of $1 + (T_V - T_R)(C_P/H_R)$;

establishing a seventeenth signal representative of the actual flow rate of said external reflux stream;

multiplying said seventeenth signal by said sixteenth signal to produce an eighteenth signal representative of the actual flow rate of the internal reflux in said fractional distillation column at a time $T_4$;

delaying said eighteenth signal to thereby establish a nineteenth signal representative of the flow rate of said internal reflux at a time $T_5$ where the time period $T_5 - T_4$ is representative of the time required for a change in the flow rate of said internal reflux to cause a change in the flow rate of said bottoms product stream;

combining said seventh signal and said nineteenth signal to thereby establish a twentieth signal representative of the desired flow rate of said heating fluid into said fractional distillation column; and manipulating the flow rate of said heating fluid into said fractional distillation column in response to said twentieth signal.

31. A method in accordance with claim 30 wherein said step of manipulating the flow rate of said heating fluid flowing into said fractional distillation column in response to said twentieth signal comprises:

establishing a twenty-first signal representative of the actual flow rate of said heating fluid;

comparing said twentieth signal and said twenty-first signal and establishing a twenty-second signal responsive to the difference between said twentieth signal and said twenty-first signal; and manipulating the flow rate of said heat fluid in response to said twenty-second signal.

32. A method in accordance with claim 17 additionally comprising the steps of:

withdrawing a bottoms product stream from a lower portion of said fractional distillation column;

establishing a sixth signal representative of the flow rate of said bottoms product stream required to maintain a desired level in a lower portion of said fractional distillation column;

establishing a seventh signal representative of the actual flow rate of said bottoms product stream;

comparing said sixth signal and said seventh signal and establishing an eighth signal responsive to the difference between said sixth signal and said seventh signal; and manipulating the flow rate of said bottoms product stream in response to said eighth signal.

* * * * *